(12) United States Patent
Jung et al.

(10) Patent No.: US 11,751,154 B2
(45) Date of Patent: *Sep. 5, 2023

(54) SYNCHRONIZATION SIGNAL BLOCK SELECTION

(71) Applicant: Lenovo (Singapore) PTE. LTD., New Tech Park (SG)

(72) Inventors: Hyejung Jung, Northbrook, IL (US); Vijay Nangia, Woodridge, IL (US); Robert T. Love, Barrington, IL (US); Ravi Kuchibhotla, Chicago, IL (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/709,109

(22) Filed: Mar. 30, 2022

(65) Prior Publication Data

US 2022/0225256 A1    Jul. 14, 2022

Related U.S. Application Data

(63) Continuation of application No. 16/917,563, filed on Jun. 30, 2020, now Pat. No. 11,297,582, which is a
(Continued)

(51) Int. Cl.
*H04W 56/00* (2009.01)
*H04L 5/00* (2006.01)
(Continued)

(52) U.S. Cl.
CPC ......... *H04W 56/0015* (2013.01); *H04L 5/005* (2013.01); *H04W 72/0453* (2013.01)

(58) Field of Classification Search
CPC ......... H04W 56/0015; H04W 72/0453; H04W 48/10; H04L 5/005; H04J 11/0073; H04J 11/0076
See application file for complete search history.

(56) References Cited

U.S. PATENT DOCUMENTS

| | | | |
|---|---|---|---|
| 10,716,079 B2 | 7/2020 | Jung et al. | |
| 11,297,582 B2 * | 4/2022 | Jung | H04W 72/0453 |

(Continued)

OTHER PUBLICATIONS

Ericsson, "Multiple SS Blocks per carrier", 3GPP TSG-RAN WG1 NR Ad-Hoc#2 R1-1710882, Jun. 27-30, 2017, pp. 1-2.
(Continued)

*Primary Examiner* — Harry H Kim
(74) *Attorney, Agent, or Firm* — Kunzler Bean & Adamson

(57) ABSTRACT

Apparatuses, methods, and systems are disclosed for synchronization signal block selection. One method includes receiving multiple synchronization signal blocks on a first wideband carrier. Each synchronization signal block includes at least one synchronization signal and a physical broadcast channel. The method includes detecting at least one synchronization signal block of the synchronization signal blocks, determining at least one synchronization signal frequency associated with the at least one detected synchronization signal block, and selecting a first synchronization signal block of the at least one detected synchronization signal block and a first synchronization signal frequency of the at least one synchronization signal frequency. The first synchronization signal block is associated with the first synchronization signal frequency. The method includes decoding a first physical broadcast channel of the first synchronization signal block, and determining whether to reselect the first synchronization signal block based on a result of decoding the first physical broadcast channel.

20 Claims, 8 Drawing Sheets

Related U.S. Application Data continuation of application No. 16/110,316, filed on Aug. 23, 2018, now Pat. No. 10,716,079.

(60) Provisional application No. 62/549,286, filed on Aug. 23, 2017.

(51) Int. Cl.
*H04W 72/04* (2023.01)
*H04J 11/00* (2006.01)
*H04W 48/10* (2009.01)
*H04W 72/0453* (2023.01)

(56) References Cited

U.S. PATENT DOCUMENTS

| | | |
|---|---|---|
| 2017/0265155 A1 | 9/2017 | Kim et al. |
| 2017/0311250 A1* | 10/2017 | Rico Alvarino ........ H04W 4/70 |
| 2018/0049082 A1* | 2/2018 | Kinthada Venkata ....................... H04W 24/10 |
| 2018/0324023 A1 | 11/2018 | Zeng et al. |
| 2018/0359716 A1 | 12/2018 | Bai et al. |
| 2019/0052334 A1 | 2/2019 | Jeon et al. |
| 2019/0053235 A1 | 2/2019 | Novlan et al. |
| 2019/0053313 A1 | 2/2019 | Zhou et al. |
| 2019/0149384 A1 | 5/2019 | Kim et al. |
| 2019/0229961 A1* | 7/2019 | Gao ...................... H04J 11/0076 |
| 2019/0253959 A1 | 8/2019 | Wei et al. |
| 2019/0268813 A1 | 8/2019 | Ramachandra et al. |
| 2019/0288813 A1 | 9/2019 | John Wilson et al. |
| 2021/0092696 A1* | 3/2021 | Ko ...................... H04W 56/001 |

OTHER PUBLICATIONS

Nec, "On SS burst set design", 3GPP TSG RAN WG1 Meeting #90 R1-1712990. Aug. 21-25, 2017, pp. 1-2.

Huawei, Hisilicon, "Remaining details on SS block and SS burst set design", 3GPP TSG RAN WG1 Meeting #90 R1-1712150. Aug. 21-25, 2017, pp. 1-3.

Nokia, Nokia Shanghai Bell, "SS-block transmission in multi CC deployments", 3GPP TSG-RAN WG1 Meeting #90 R1-1714006. Aug. 21-25, 2017, p. 1-5.

Qualcomm Incorporated, "PBCH design considerations", 3GPP TSG-RAN WG1 #88bis R1-1705568, Apr. 3-7, 2017, pp. 1-8.

Qualcomm Incorporated, "SS block, burst-set composition, and time index indication", 3GPP TSG-RAN WG1 NR#88bis R1-1705565, Apr. 3-7, 2017, pp. 1-10.

\* cited by examiner

SYNCHRONIZATION SIGNAL BLOCK SELECTION

CROSS-REFERENCE TO RELATED APPLICATIONS

This application is a continuation application of U.S. patent application Ser. No. 16/917,563 filed on Jun. 30, 2020, which claims priority to U.S. patent application Ser. No. 16/110,316 filed on Aug. 23, 2018, which claims priority to U.S. Patent Application Ser. No. 62/549,286 entitled "MEASUREMENT AND SS FREQUENCY SELECTION IN A WIDEBAND CARRIER" and filed on Aug. 23, 2017 for Hyejung Jung, all of which are incorporated herein by reference in their entirety.

FIELD

The subject matter disclosed herein relates generally to wireless communications and more particularly relates to synchronization signal block selection.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Base Station ("BS"), Bandwidth ("BW"), Bandwidth Part ("BWP"), Component Carrier ("CC"), Clear Channel Assessment ("CCA"), Common Control Resource Set ("CORESET"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), g Node B ("gNB"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Local Oscillator ("LO"), Long Term Evolution ("LTE"), Least Significant Bit ("LSB"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Network Entity ("NE"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Primary Synchronization Signal ("PSS"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Channel ("RACH"), Random Access Response ("RAR"), Radio Network Temporary Identifier ("RNTI"), Reference Signal ("RS"), Remaining Minimum System Information ("RMSI"), Radio Resource Management ("RRM"), Reference Signal Received Power ("RSRP"), Reference Signal Received Quality ("RSRQ"), Resource Spread Multiple Access ("RSMA"), Reference Signal Signal to Interference and Noise Ratio ("RS-SINR"), Round Trip Time ("RTT"), Receive ("RX"), Sparse Code Multiple Access ("SCMA"), Subcarrier Spacing ("SCS"), Scheduling Request ("SR"), Single Carrier Frequency Division Multiple Access ("SC-FDMA"), Secondary Cell ("SCell"), Shared Channel ("SCH"), System Frame Number ("SFN"), Signal-to-Interference-Plus-Noise Ratio ("SINR"), System Information Block ("SIB"), SS/PBCH Block Measurement Time Configuration ("SMTC"), Synchronization Signal ("SS"), Secondary Synchronization Signal ("SSS"), Transport Block ("TB"), Transport Block Size ("TBS"), Time-Division Duplex ("TDD"), Time Division Multiplex ("TDM"), Time Division Orthogonal Cover Code ("TD-OCC"), Transmit/Receive Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, synchronization signal blocks may be used. In such networks, a frequency corresponding to a synchronization signal block may be unknown.

BRIEF SUMMARY

Methods for synchronization signal block selection are disclosed. Apparatuses and systems also perform the functions of the method. In one embodiment, the method includes receiving multiple synchronization signal blocks on a first wideband carrier. In such an embodiment, each synchronization signal block of the multiple synchronization signal blocks includes at least one synchronization signal and a physical broadcast channel. In certain embodiments, the method includes detecting at least one synchronization signal block of the multiple synchronization signal blocks. In some embodiments, the method includes determining at least one synchronization signal frequency associated with the at least one detected synchronization signal block. In various embodiments, the method includes selecting a first synchronization signal block of the at least one detected synchronization signal block and a first synchronization signal frequency of the at least one synchronization signal frequency. In such embodiments, the first synchronization signal block is associated with the first synchronization signal frequency. In certain embodiments, the method includes decoding a first physical broadcast channel of the first synchronization signal block. In some embodiments, the method includes determining whether to reselect the first synchronization signal block based on a result of decoding the first physical broadcast channel.

One apparatus for synchronization signal block selection includes a receiver that receives multiple synchronization signal blocks on a first wideband carrier. In such an embodiment, each synchronization signal block of the multiple synchronization signal blocks includes at least one synchronization signal and a physical broadcast channel. In certain embodiments, the apparatus includes a processor that: detects at least one synchronization signal block of the multiple synchronization signal blocks; determines at least one synchronization signal frequency associated with the at least one detected synchronization signal block; selects a first synchronization signal block of the at least one detected synchronization signal block and a first synchronization signal frequency of the at least one synchronization signal frequency, wherein the first synchronization signal block is associated with the first synchronization signal frequency; decodes a first physical broadcast channel of the first synchronization signal block; and determines whether to reselect the first synchronization signal block based on a result of decoding the first physical broadcast channel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
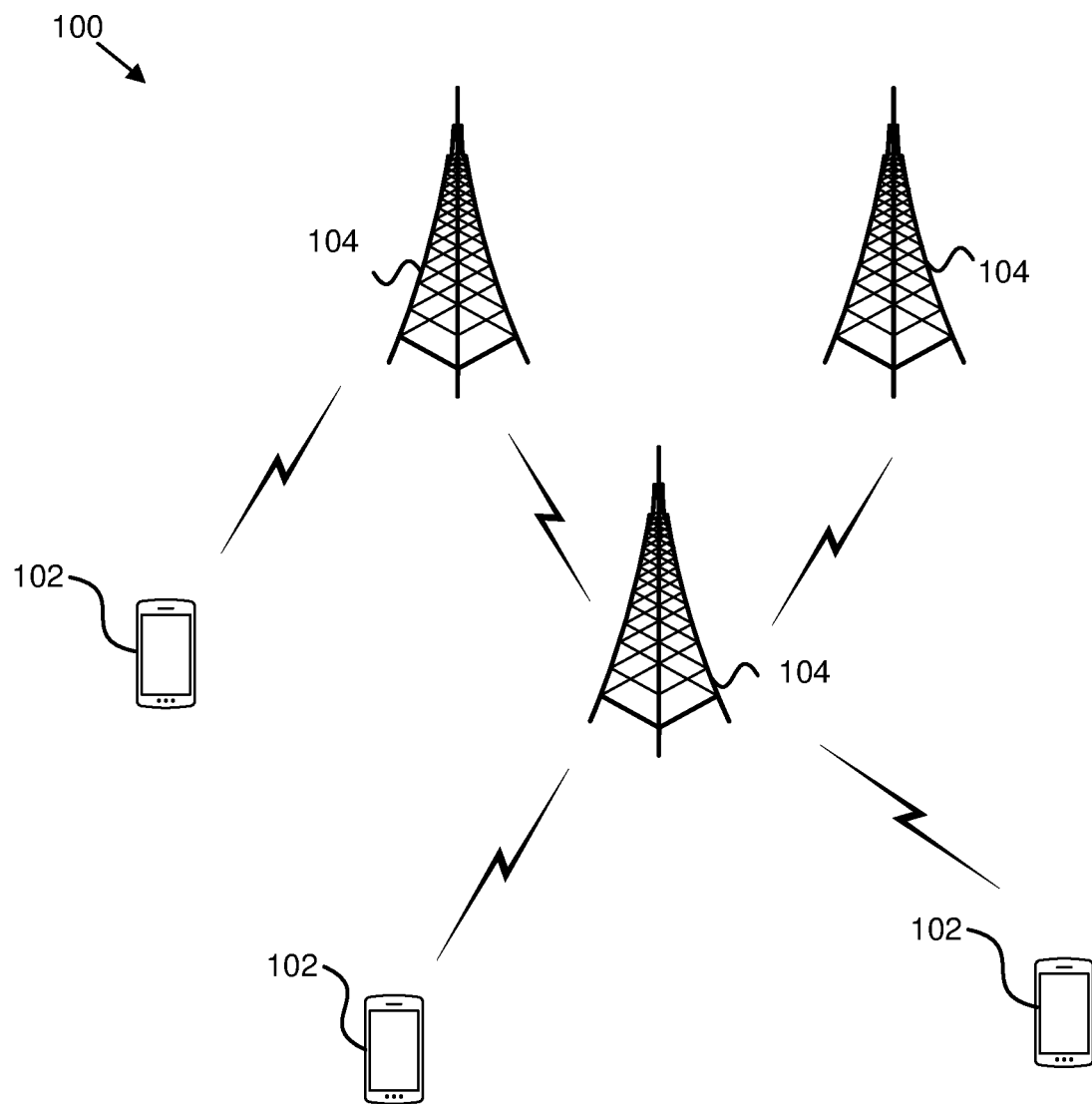
FIG. 1 is a schematic block diagram illustrating one embodiment of a wireless communication system for synchronization signal block selection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for synchronization signal block selection. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive multiple synchronization signal blocks on a first wideband carrier. In such an embodiment, each synchronization signal block of the multiple synchronization signal blocks may include at least one synchronization signal and a physical broadcast channel. In certain embodiments, the remote unit 102 may detect at least one synchronization signal block of the multiple synchronization signal blocks. In some embodiments, the remote unit 102 may determine at least one synchronization signal frequency associated with the at least one detected synchronization signal block. In various embodiments, the remote unit 102 may select a first synchronization signal block of the at least one detected synchronization signal block and a first synchronization signal frequency of the at least one synchronization signal frequency. In such embodiments, the first synchronization signal block is associated with the first synchronization signal frequency. In certain embodiments, the remote unit 102 may decode a first physical broadcast channel of the first synchronization signal block. In some embodiments, the remote unit 102 may determine whether to reselect the first synchronization signal block based on a result of decoding the first physical broadcast channel. Accordingly, the remote unit 102 may perform synchronization signal block selection.

In various embodiments, a network unit 104 may transmit multiple synchronization signal blocks on a first wideband carrier. In such an embodiment, each synchronization signal block of the multiple synchronization signal blocks includes at least one synchronization signal and a physical broadcast channel. In certain embodiments, the network unit 104 may establish a radio resource control connection with a remote unit 102. In such embodiments, the remote unit 102 may detect at least one synchronization signal block of the multiple synchronization signal blocks; determine at least one synchronization signal frequency associated with the at least one detected synchronization signal block; select a first synchronization signal block of the at least one detected synchronization signal block and a first synchronization signal frequency of the at least one synchronization signal frequency, wherein the first synchronization signal block is associated with the first synchronization signal frequency; decode a first physical broadcast channel of the first synchronization signal block; and determine whether to reselect the first synchronization signal block based on a result of decoding the first physical broadcast channel. Accordingly, the network unit 104 may be used for synchronization signal block selection.

Figure 2:
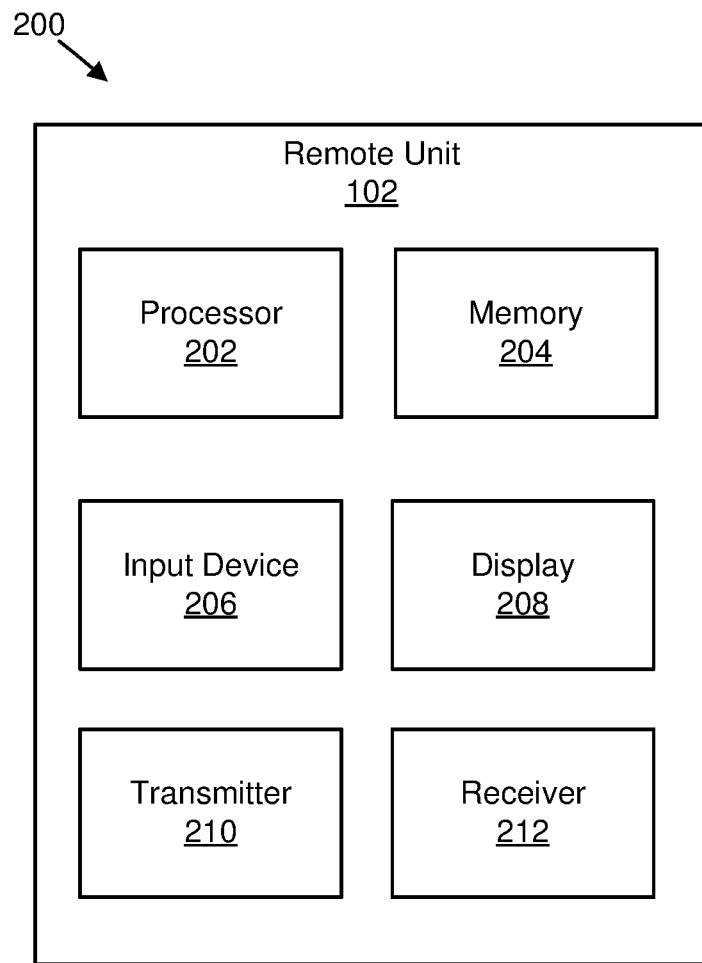
FIG. 2 is a schematic block diagram illustrating one embodiment of an apparatus that may perform synchronization signal block selection.

FIG. 2 depicts one embodiment of an apparatus 200 that may perform synchronization signal block selection. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: detects at least one synchronization signal block of the multiple synchronization signal blocks; determine at least one synchronization signal frequency associated with the at least one detected synchronization signal block; select a first synchronization signal block of the at least one detected synchronization signal block and a first synchronization signal frequency of the at least one synchronization signal frequency, wherein the first synchronization signal block is associated with the first synchronization signal frequency; decode a first physical broadcast channel of the first synchronization signal block; and determine whether to reselect the first synchronization signal block based on a result of decoding the first physical broadcast channel. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 may be used to receive multiple synchronization signal blocks on a first wideband carrier. In such embodiments, each synchronization signal block of the multiple synchronization signal blocks includes at least one synchronization signal and a physical broadcast channel. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
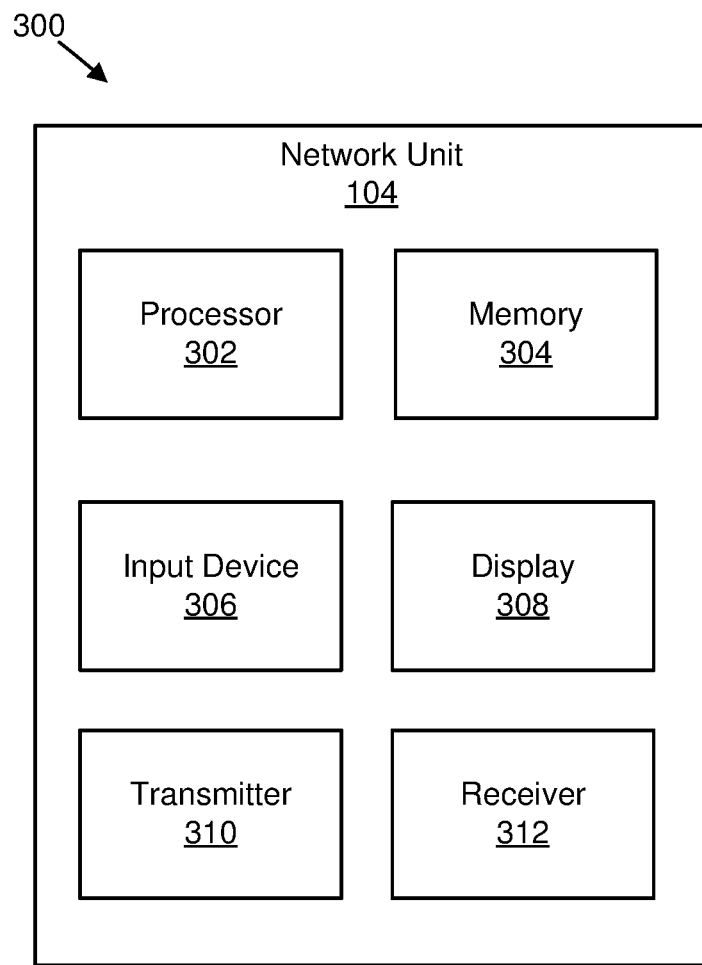
FIG. 3 is a schematic block diagram illustrating another embodiment of an apparatus that may be used for synchronization signal block selection.

FIG. 3 depicts one embodiment of an apparatus 300 that may be used for synchronization signal block selection. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
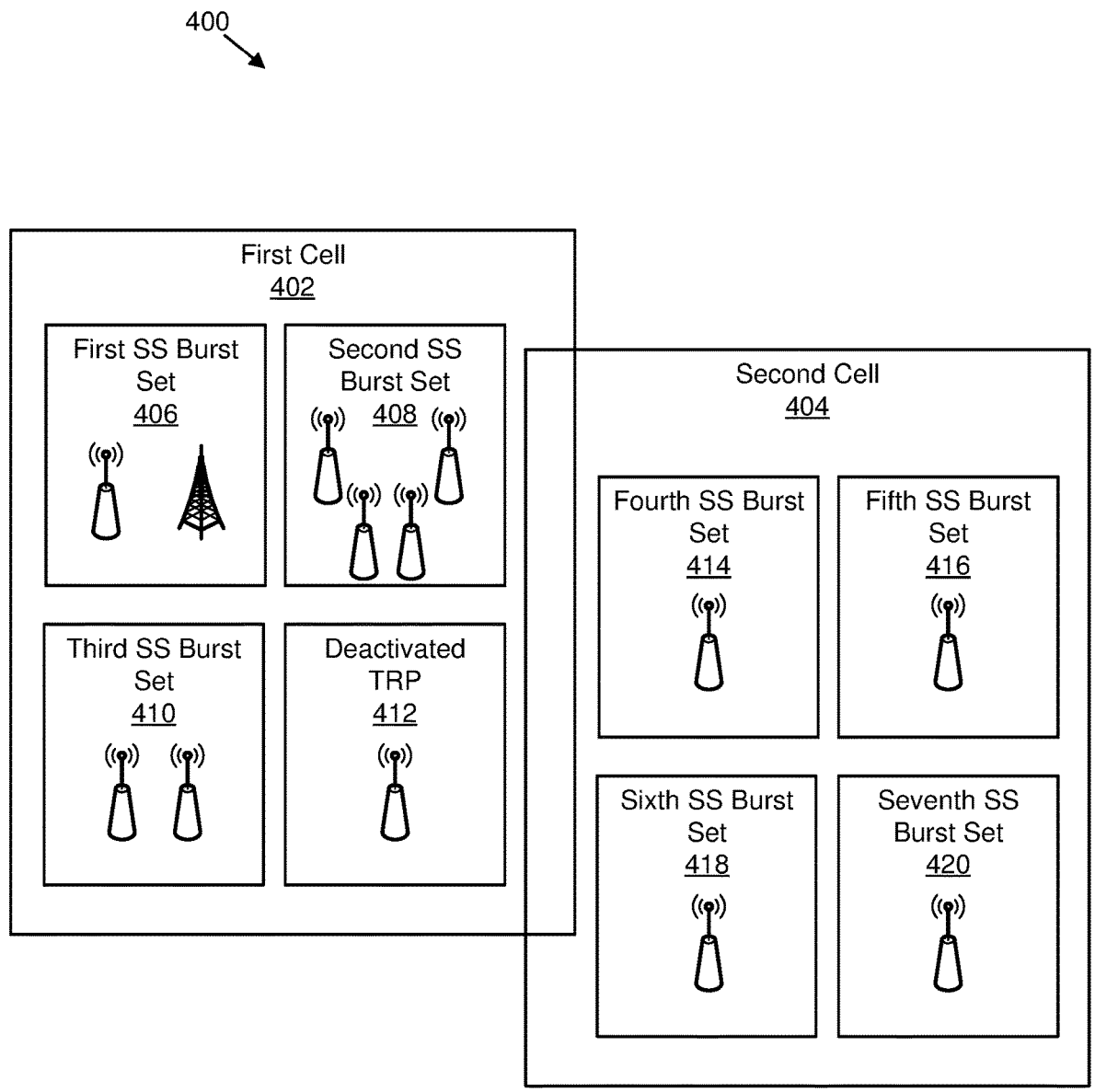
FIG. 4 is a schematic block diagram illustrating one embodiment of a deployment of a system including a wideband component carrier with multiple synchronization signal burst sets in frequency.

FIG. 4 is a schematic block diagram illustrating one embodiment of a deployment of a system 400 including a wideband component carrier with multiple synchronization signal burst sets in frequency.

The system 400 includes a first cell 402 and a second cell 404. As illustrated, the first cell 402 and the second cell 404 may overlap one another. The first cell 402 includes a first SS burst set 406, a second SS burst set 408, a third SS burst set 410, and a deactivated TRP 412. As may be appreciated, any of the first SS burst set 406, the second SS burst set 408, and the third SS burst set 410 may include multiple nodes. The second cell 404 includes a fourth SS burst set 414, a fifth SS burst set 416, a sixth SS burst set 418, and a seventh SS burst set 420. Again, any of the fourth SS burst set 414, the fifth SS burst set 416, the sixth SS burst set 418, and the seventh SS burst set 420 may include multiple nodes.

In various embodiments, a BWP having a group of contiguous PRBs may be used to support reduced UE BW capability, UE BW adaptation, FDM of multiple numerologies, and/or use of a non-contiguous spectrum. In some embodiments, a connected mode UE may be UE-specifically and/or semi-statically configured with one or more active BWPs for a single wideband carrier. In certain embodiments, a bandwidth of a BWP equals or is smaller than a maximum UE bandwidth capability, but may be at least as large as a bandwidth of an SS block. In such embodiments, the SS block may include primary SS, secondary SS, and/or PBCH. In various embodiments, different UEs' BWPs may fully overlap or may partially overlap. In such embodiments, it may be up to a NE (e.g., gNB) to coordinate scheduling of different UEs' BWPs. As may be appreciated, configuration parameters of a BWP may include numerology (e.g., subcarrier spacing), a frequency location (e.g., center frequency), and/or a bandwidth (e.g., a number of PRBs). In some embodiments, the BWP may contain an SS block, while in other embodiments, the BWP may not contain an SS block.

In certain embodiments, multiple SS burst set transmissions (e.g., an SS burst set may be a set of one or more SS blocks transmitted periodically) in frequency may make a gNB able to more easily configure a UE. The UE may have a smaller operating bandwidth than a carrier bandwidth. The gNB may configure the UE with a BWP including one or more SS blocks and may allow the UE to detect and/or measure the one or more SS blocks without LO retuning. In various embodiments, transmitting multiple SS burst sets on different SS raster frequencies of a wideband carrier may distribute UEs in idle or inactive mode across different SS burst sets and different common search spaces, thereby potentially reducing paging and/or random access related (e.g., message 2) load in each common search space.

Described herein are various methods that may be used by a UE to efficiently measure multiple SS burst sets in frequency of a wideband CC and/or select one SS burst set of the wideband CC.

In one embodiment, multiple SS burst sets in frequency are transmitted on SS raster frequencies in a wideband carrier. In such embodiments, if multiple SS burst sets transmitted in frequency are associated with a single wideband CC (e.g., a single scheduling entity capable of addressing any frequency part of the wideband CC), the same PSS/SSS sequences may be employed for those SS burst sets to implicitly indicate to a UE an association of those SS burst sets. In some embodiments, to differentiate multiple SS burst sets in frequency of a wideband CC, a few bits may be used to indicate indices of frequency-domain SS burst sets and may be included as payload of PBCH or RMSI. In such embodiments, these indices may be used to construct extended physical cell IDs (e.g., in addition to a physical cell ID mapped to PSS/SSS sequences of the SS block) addressing multiple logical cells of a wideband CC. Moreover, in such embodiments, each logical cell may schedule any part of the wideband CC and may be associated with one SS burst set in frequency of the wideband CC. In certain embodiments, a payload of PBCH or RMSI may include an indication of a frequency separation and/or offset of a frequency-domain SS burst sets from a reference point (e.g., a center and/or edge of the wideband CC or reference SS raster frequency that may correspond to approximately the center and/or edge of the wideband CC or reference frequency-domain SS burst location and/or position) in terms of multiple SS raster steps or PRBs with subcarrier spacing equal to SS subcarrier spacing. In various embodiments, an extended cell ID may be determined based on a frequency separation and/or offset indication (e.g., in addition to a cell ID mapped to PSS/SSS sequences of an SS block). In some embodiments, a frequency-domain SS burst set index may be determined based on a frequency separation and/or offset indication (e.g., index 0 for reference frequency-domain SS burst set). In certain embodiments, another way to differentiate multiple SS burst sets in frequency of a wideband CC is to use different PSS/SSS sequences (e.g., using different physical cell IDs) on different SS blocks in different frequencies.

In various embodiments, UEs operated with a narrowband transceiver may be able to use only some frequency parts within a wideband CC at a given time. Thus, a number of SS burst sets in frequency for the wideband CC may need to be large enough to distribute narrowband UEs across multiple frequency parts of the wideband CC. In such embodiments, signaling overhead in PBCH and radio resource overhead from multiple SS burst set transmissions in frequency may be taken into account. In one example, assuming a 400 MHz or 800 MHz carrier bandwidth and 100 MHz minimum UE bandwidth in high frequency bands (e.g., frequency band above 6 GHz), a maximum of approximately 4 to 8 SS block transmissions in frequency may be used (e.g., up to approximately 4 to 8 SS burst sets in frequency with approximately 2 to 3 bits for an indication in PBCH or RMSI).

In some embodiments, if multiple SS burst sets in frequency associated with a wideband CC are transmitted in SS raster frequencies, each frequency part within the wideband CC having a SS burst set may be self-discoverable. In certain embodiments, an idle mode UE may camp on one SS burst set in frequency of the wideband CC. In such embodiments, the UE may camp on the SS burst set as long as a PBCH and/or an RMSI of the SS burst set indicates that a logical cell associated with the SS burst set is not barred for the UE to camp on it. In certain embodiments, not only connected mode UEs (e.g., which may be informed of specific frequency locations of multiple SS burst sets of the wideband CC), but also idle mode or initial access UEs which are not informed of specific frequency locations of multiple SS burst sets of the wideband CC may be able to combine multiple PSS/SSS sequence correlation outputs obtained from the different SS raster frequency locations (e.g., combining is up to UE implementation and may be when UE bandwidth spans multiple SS raster frequency locations with SS burst and SS burst on the multiple SS raster frequency locations are transmitted at the same time or overlapping time instances) and/or reduce cell detection latency.

In another embodiment, each SS burst set of multiple SS burst sets in frequency for a wideband CC may have a separate configuration in terms of SS burst set periodicity, a number of SS blocks per SS burst set (e.g., number of downlink transmit beams per SS burst set), SS transmit power, and/or SS block time locations (e.g., actually transmitted) within an SS burst set. In some embodiments, multiple SS burst sets for a wideband CC may be transmitted from the same or from different (e.g., synchronized and coordinated) network nodes or TRPs depending on deployment scenarios as shown in FIG. 4, and accordingly separate configuration for each SS burst set of the wideband CC may be used. Furthermore, in certain embodiments, corresponding RMSI contents including configurations of SS burst set and RACH may be different per SS burst set in frequency. In such embodiments, the RMSI may be remaining essential system information not carried by PBCH.

In some embodiments, depending on user distribution or cell loading conditions, some logical cells of a wideband CC may be used less or not used for a given time duration. In such embodiments, SS burst sets for those logical cells may be transmitted with longer periodicity. Also, in such embodiments, different network nodes for the wideband CC may have a different number of antenna groups and/or belong to different BS power classes, leading to different number of TX beams and/or different SS transmit power. In certain embodiments, for SS block time locations, some coordination may be used across frequency parts to avoid DL and/or UL interference. For example, if all logical cells of the wideband CC are co-located at a node (e.g., one node transmits multiple SS burst sets in frequency) and the node does not have full-duplex (e.g., simultaneous transmission and reception within a same or adjacent frequency parts) capability, the node may coordinate time locations of transmitted SS blocks of the multiple SS burst sets to have common DL and/or UL regions across the frequency parts. In certain embodiments, it may be desired to define a separate configuration signaling for each SS burst set, in order to accommodate various deployment scenarios.

In one embodiment, an idle and/or inactive mode UE or initial access UE with a narrowband receiver may select an SS burst set in frequency and a corresponding logical cell. The UE may select the SS burst set in frequency and the corresponding logical cell based on RRM measurements and frequency location and/or bandwidth of a CORESET associated with a detected and selected SS block of the SS burst set. In certain embodiments, a common CORESET may be used to at least to schedule PDSCH carrying RMSI. In such embodiments, the RMSI may be associated with the SS burst set. For example, in one embodiment, a UE selects one SS burst set in frequency among SS burst sets for which RSRP, RSRQ, and/or RS-SINR measurement results are above threshold values and transmissions of the SS burst set, the CORESET for RMSI scheduling, and/or PDSCH for RMSI delivery are confined within UE's operating BW. In certain embodiments, PBCH in a detected and/or selected SS block may indicate time and/or frequency location of the common CORESET. Additionally, in various embodiments, if PBCH indicates SCS of a common CORESET, a UE may select an SS burst set in frequency which indicates UE's supported and/or preferred SCS for the common CORESET (and possibly UE specific CORESET, which may use the same SCS as the common CORESET).

In another embodiment, a NE may signal RSRP, RSRQ, and/or RS-SINR offset values (e.g., for different frequency-domain SS burst sets) which a UE may apply to rank SS burst sets in frequency in RMSI. In certain embodiments, RMSI of each SS burst set in frequency may include SS frequency-specific RSRP, RSRQ, and/or RS-SINR offset values for all the SS frequencies of the wideband CC so that the UE may re-select a serving SS frequency (e.g., a serving SS burst set in frequency) within the wideband CC without decoding RMSI of other SS burst sets in frequency. In some embodiments, RSRP, RSRQ, and/or RS-SINR offset may be used for a NE to manage loads across multiple SS burst sets in frequency.

In certain embodiments, an SS burst set index in frequency may implicitly indicate priority of each SS burst set and a corresponding logical cell. For example, a frequency-domain SS burst set with an index '0' may have a highest priority and logical cell selection priority may decrease with an increase of the frequency-domain SS burst set index number. In some embodiments, among suitable SS burst sets in frequency (e.g., the SS burst sets for which RSRP, RSRQ, and/or RS-SINR measurement results are above threshold values), a UE may select an SS burst set in frequency with a highest priority. In one example, an idle mode UE may generally camp on a frequency-domain SS burst set indexed with 0 (e.g., binary bits '00').

In various embodiments, a UE may select an SS burst set in frequency which has a largest number of suitable SS blocks (e.g., a number of SS blocks for which the measurement values are above threshold values). In some embodiments, a narrowband UE may select an SS burst set in frequency which has a shortest SS burst set periodicity among suitable SS burst sets in frequency.

In one embodiment, a network node configures a UE with a few (e.g., approximately 1 to 2) SMTCs per wideband CC. In such an embodiment, each SMTC may include indications on measurement window periodicity, measurement window duration, measurement window time offset, a subset of SS frequencies of the wideband CC, and/or SS frequency specific additional time offsets for the subset of SS frequencies of the wideband CC. As used herein, SS frequencies of the wideband CC may be frequencies in which multiple SS burst sets in frequency are transmitted. In one example, all the SS frequencies of the wideband CC are SS raster frequencies in a given frequency band. In such an example, the SS raster frequencies in the given frequency band are a set of frequencies that an initial access UE may scan in the given frequency band for cell search. In another example, some SS frequencies of the wideband CC are SS raster frequencies of the given frequency band, and other SS frequencies of the wideband CC are not SS raster frequencies.

In certain embodiments, if multiple SS burst sets of a wideband CC provide different spatial coverages, a UE connected to the wideband CC (e.g., served by one logical cell of the wideband CC) may have to frequently measure SS frequencies which are different from a current serving SS frequency but part of SS frequencies of the wideband CC. As may be appreciated, because multiple SS burst sets of a wideband CC may be transmitted from a single node or synchronized (and coordinated) multiple nodes, an allowed set of SS block time locations is common (e.g., in terms of absolute time) for the multiple SS burst sets. In various embodiments, UEs with wideband receiver capability may be able to measure multiple SS frequencies, such as in embodiments in which the multiple SS burst sets are transmitted simultaneously. In some embodiments, UEs operated with narrowband receivers may be able to measure only one (or a subset of) SS frequency at a given time. In such embodiments, it may take much longer time for the narrowband UEs to perform SS block based measurements on all the SS frequencies of the wideband CC than for wideband UEs.

Figure 5:
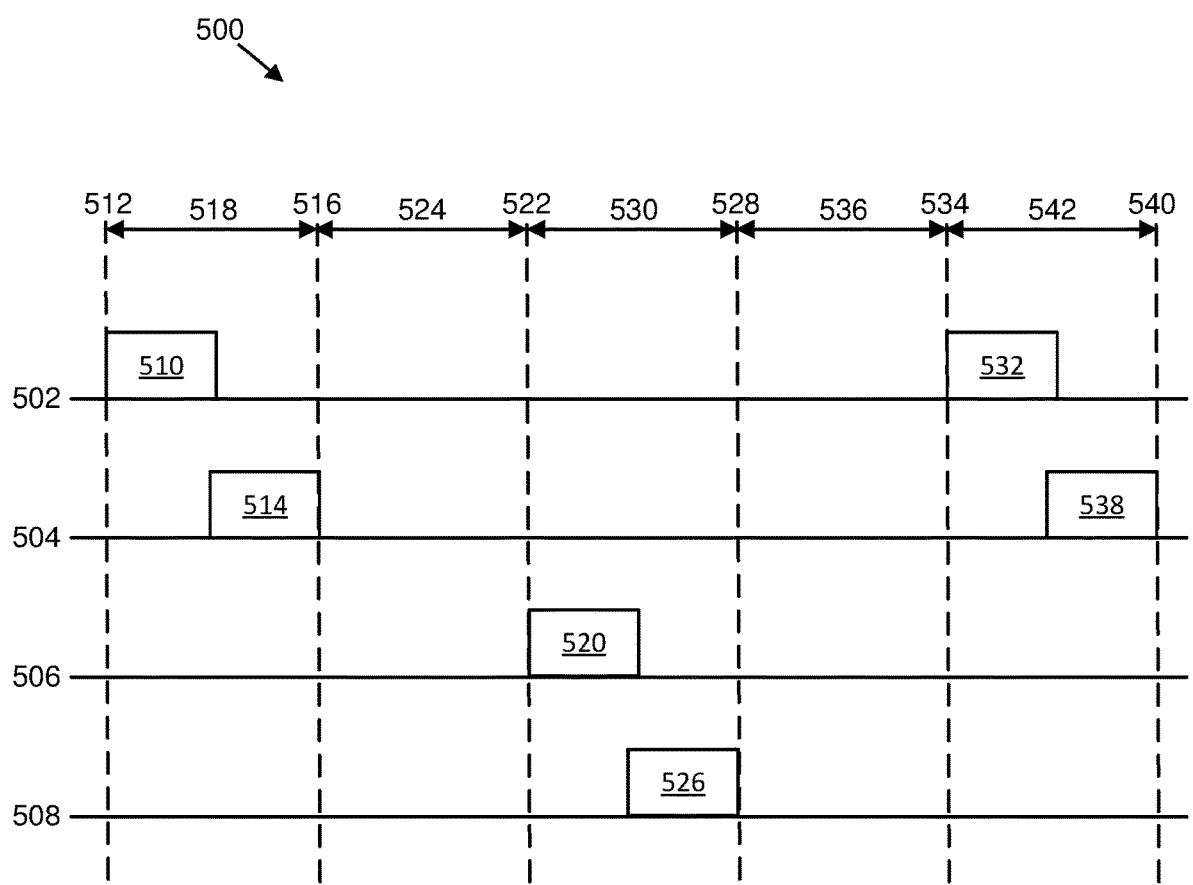
FIG. 5 is a timing diagram illustrating one embodiment of multiple synchronization signal burst set transmissions in frequency for a wideband component carrier.

FIG. 5 is a timing diagram 500 illustrating one embodiment of multiple synchronization signal burst set transmissions in frequency for a wideband component carrier. The timing diagram 500 illustrates 240 kHz SCS for an SS block. Furthermore, the timing diagram 500 illustrates a first SS frequency 502, a second SS frequency 504, a third SS frequency 506, and a fourth SS frequency 508. On the first SS frequency 502, a first SS burst set 510 is transmitted at a first time 512. Moreover, following the first SS burst set 510 and on the second SS frequency 504, a second SS burst set 514 is transmitted to end at a second time 516. A first period 518 between the first time 512 and the second time 516 may be approximately 5 ms. On the third SS frequency 506, a third SS burst set 520 is transmitted at a third time 522. A second period 524 between the second time 516 and the third time 522 may be approximately 5 ms. Moreover, following the third SS burst set 520 and on the fourth SS frequency 508, a fourth SS burst set 526 is transmitted to end at a fourth time 528. A third period 530 between the third time 522 and the fourth time 528 may be approximately 5 ms. On the first SS frequency 502, a fifth SS burst set 532 (e.g., a repeat of the first SS burst set 510) is transmitted at a fifth time 534. A fourth period 536 between the fourth time 528 and the fifth time 534 may be approximately 5 ms. Moreover, following the fifth SS burst set 532 and on the second SS frequency 504, a sixth SS burst set 538 (e.g., a repeat of the second SS burst set 514) is transmitted to end at a sixth time 540. A fifth period 542 between the fifth time 534 and the sixth time 540 may be approximately 5 ms. As may be appreciated, the first SS burst set 510, the second SS burst set 514, the third SS burst set 520, and the fourth SS burst set 526 may continue to repeat any suitable number of times.

Figure 6:
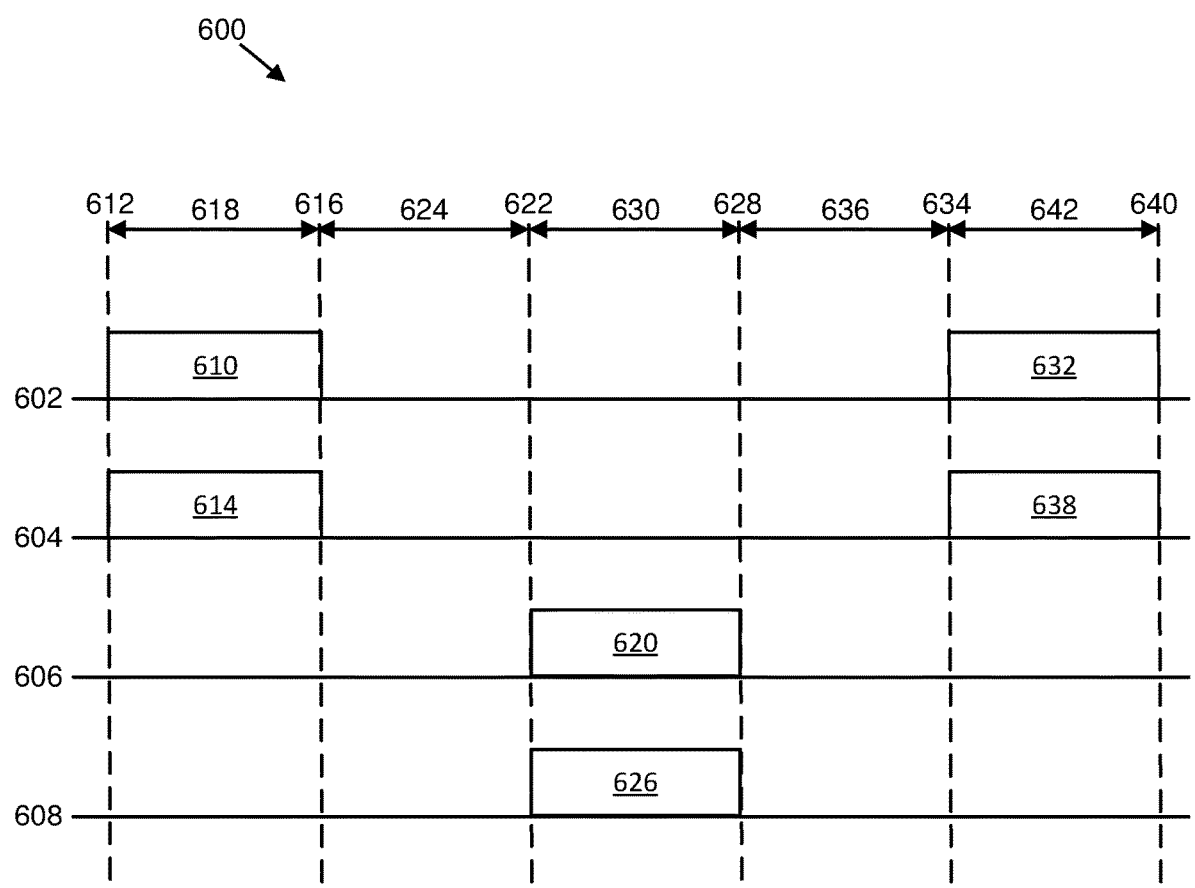
FIG. 6 is a timing diagram illustrating another embodiment of multiple synchronization signal burst set transmissions in frequency for a wideband component carrier.

FIG. 6 is a timing diagram 600 illustrating another embodiment of multiple synchronization signal burst set transmissions in frequency for a wideband component carrier. The timing diagram 600 illustrates 120 kHz SCS for an SS block. Furthermore, the timing diagram 600 illustrates a first SS frequency 602, a second SS frequency 604, a third SS frequency 606, and a fourth SS frequency 608. On the first SS frequency 602, a first SS burst set 610 is transmitted at a first time 612. Moreover, at approximately the same time as the first SS burst set 610 and on the second SS frequency 604, a second SS burst set 614 is transmitted. The first SS burst set 610 and the second SS burst set 614 end at approximately a second time 616. A first period 618 between the first time 612 and the second time 616 may be approximately 5 ms. On the third SS frequency 606, a third SS burst set 620 is transmitted at a third time 622. A second period 624 between the second time 616 and the third time 622 may be approximately 5 ms. Moreover, at approximately the same time as the third SS burst set 620 and on the fourth SS frequency 608, a fourth SS burst set 626 is transmitted. The third SS burst set 620 and the fourth SS burst set 622 end at approximately a fourth time 628. A third period 630 between the third time 622 and the fourth time 628 may be approximately 5 ms. On the first SS frequency 602, a fifth SS burst set 632 (e.g., a repeat of the first burst set 610) is transmitted at a fifth time 634. A fourth period 636 between the fourth time 628 and the fifth time 634 may be approximately 5 ms. Moreover, at approximately the same time as the fifth SS burst set 632 and on the second SS frequency 604, a sixth SS burst set 638 (e.g., a repeat of the second burst set 614) is transmitted. The fifth SS burst set 632 and the sixth SS burst set 638 end at approximately a sixth time 640. A fifth period 642 between the fifth time 634 and the sixth time 640 may be approximately 5 ms. As may be appreciated, the first SS burst set 610, the second SS burst set 614, the third SS burst set 620, and the fourth SS burst set 626 may continue to repeat any suitable number of times.

In some embodiments, if a NE applies slot-level or sub-frame-level SS frequency specific time offsets (with respect to a set of SS block time locations predefined per frequency band or with respect to a reference set of SS block time locations which is used by a "reference SS burst set" in frequency, e.g., frequency-domain SS burst set indexed with 0, or SS burst set transmitted on a SS raster frequency) to transmit the SS burst sets on the different SS frequencies of the wideband CC, the narrowband UEs can also measure all the SS frequencies more quickly, especially for the SS burst sets with longer periodicities (e.g., 20 ms or longer). In various embodiments, time offset values may be predefined depending on SCS of an SS block and/or periodicity of an SS burst set, and PBCH and/or RMSI may indicate an exact timing offset applied to each SS burst set. For example, as shown in FIG. 5, time offset values {0 ms (for the first SS burst set 510), 2.5 ms (for the second SS burst set 514), 10 ms (for the third SS burst set 520), 12.5 ms (for the fourth SS burst set 526)} are allowed for SS block of 240 kHz SCS and SS burst set periodicity of 20 ms or longer. For 240 kHz SCS, the time offset values {0, 2.5, 10, 12.5} ms correspond to {0, 40, 160, 200} slots. As another example, as shown in FIG. 6, time offset values {0 ms (for the first SS burst set 610), 0 ms (for the second SS burst set 614), 10 ms (for the third SS burst set 620), 10 ms (for the fourth SS burst set 626)} are allowed for SS block of 120 kHz SCS and SS burst set periodicity of 20 ms or longer. Alternatively, in certain embodiments, SS frequency specific time offset values applied and SS burst set periodicities may be indicated in respective RMSI for each SS burst set in frequency. In embodiments in which the NE transmits multiple SS burst sets in frequency with the same set of downlink TX beams, narrowband UEs may not need to perform frequent measurements on non-serving SS frequencies of the wideband CC, and SS frequency specific time offset values may be set to zero for all the SS burst set in frequencies of the wideband CC.

In some embodiments, a connected mode UE may be configured with a separate SMTC per SS frequency of serving or non-serving wideband CC including separate measurement window periodicity, duration, and/or offset information. However, this may cause high signaling overhead for measurement configuration and may lead to too frequent measurement gaps for the narrowband UEs. Instead, in certain embodiments, a connected mode UE may receive a few SMTCs per wideband CC, each of which may include measurement window periodicity, duration, offset, associated SS frequencies of the wideband CC, and/or SS frequency specific additional time offsets for the associated SS frequencies.

In various embodiments, if a connected mode UE is configured with a single BWP SCS which is different from a SCS of SS blocks (that may be predefined for a corresponding frequency band), SS blocks may not be transmitted on that BWP, but may be transmitted on another BWP configured with an SCS the same as the SCS of the SS block. In such embodiments, the UE may have to retune its LO and adjust subcarrier spacing (and potentially sampling rate) for SS block based measurements. However, frequent LO retuning for intra-frequency measurement and time/frequency tracking may be avoided if a gNB configures the UE with CSI-RS based L3 measurement and tracking reference signal.

In some embodiments, if all frequency parts within a wideband carrier adopt an SCS (e.g., 120 kHz) different from an SCS (e.g., 240 kHz) of SS blocks, the SS blocks of one SS burst set of the wideband carrier may be time-multiplexed or time/frequency-multiplexed with data and control channels of the different SCS (e.g., 120 kHz) within a frequency part. In certain embodiments, if a UE is configured with at least one BWP including SS blocks, the UE may not need to retune LO, but may adjust operational subcarrier spacing (and potentially sampling rate) for SS block based measurements. In such embodiments, during SS block measurement the UE may not be able to receive data and control channels unless the UE supports simultaneous operation of two subcarrier spacings.

In various embodiments, in NR, an SS block time index within an SS burst set may be indicated based on a PBCH-DMRS sequence index (e.g., 3 bits for 8 possible PBCH DM-RS sequences) for low frequency bands (e.g., below 6 GHz). In such embodiments, for high frequency bands (e.g., above 6 GHz), in addition to the PBCH-DMRS sequence index, additional bits (e.g., 3 additional bits) for an SS block time index (e.g., 6 bits) may be indicated in the PBCH to support more than 8 SS blocks. In some embodiments, SS block time locations in an SS burst set may be indexed from 0 to L−1 in increasing order within a half radio frame. For embodiments in which L=8 or L=64, 3 LSBs of an SS block time index are indicated by 8 different PBCH-DMRS sequences {$a\_0, \ldots, a\_7$}. For embodiments in which L=4, 2 LSBs of SS block time index may be indicated by 4 different PBCH-DMRS sequences {$b\_0, \ldots, b\_3$} with the one remaining bit out of 3 LSBs set to 0 and not transmitted by PBCH. In various embodiments, {$a\_0, \ldots, a\_3$} may be the same as {$b\_0, \ldots, b\_3$} for a given cell ID indicated by PSS/SSS.

In certain embodiments, to reduce handover delay and/or latency for handover, direct SFN reading from a target cell (at handover) may not be required for a UE. In some embodiments, while performing handoff, there may be no need for UEs to read PBCH in a target cell to obtain a SFN message before sending PRACH. In such embodiments, because a SFN in included in PBCH, and to support PRACH resource periodicity of larger than 10 ms (e.g., 20 ms), SFN even/odd synchronization between a serving cell and a target cell may be used. Thus, the UE may for handover purposes assume an absolute value of a relative time difference between radio frame i in the current serving cell and the target cell to be less than 5 ms (e.g., half of a 10 ms radio frame). In addition, half radio frame timing may be indicated in the PBCH which may be irrespective of SS burst set periodicity. This may be needed for an SS burst set periodicity of 5 ms. Thus, in some embodiments, to support a UE not required to read PBCH in a target cell to obtain half radio frame timing and a SFN message before sending PRACH (e.g., PRACH resource periodicity of 10 ms or larger), half radio frame even/odd synchronization (in addition to SFN even/odd synchronization) between a serving cell and a target cell may be used. In such embodiments, the UE may for handover purposes assume an absolute value of the relative time difference between radio frame i in the current serving cell and the target cell to be less than 2.5 ms (e.g., half of a 5 ms half radio frame).

In various embodiments, detecting an SS block in an SS burst set may not provide adequate information for determining a slot index within which the SS block is detected. This may occur when a portion of the SS block time index is indicated in the PBCH (e.g., number of SS blocks more than 8 SS blocks, L>8, SS blocks with subcarrier spacing larger than 30 kHz (e.g., 120 kHz, 240 kHz)). Thus, in such embodiments, during a random access procedure (e.g., Msg 2—random access response), a PDSCH scrambling sequence generator initialization may not be based on the slot index. In some embodiments, because part of an SS block time index (e.g., 3 LSB bits) may be determined from a PBCH-DMRS sequence index, during random access procedure (and before a UE has read PBCH in a target cell during handover) a PDSCH scrambling sequence generator initialization may be based on 3 LSB bits of the SS block time index or the PBCH-DMRS sequence index. In certain embodiments, a PDSCH scrambling sequence generator initialization may be based on a physical cell identity, a virtual cell identity, and/or a logical cell identity.

In various embodiments, during handover a serving cell may provide an SS block time index (or a portion—e.g., 3 LSB bits of the SS block time index or a PBCH-DMRS sequence index) for a target cell, and a UE may perform random access on a RACH resource associated with the SS block time index. In one example, to prevent target cell PBCH reading before transmitting a PRACH preamble (e.g., number of SS blocks more than 8 SS blocks, L>8, SS blocks with subcarrier spacing larger than 30 kHz (e.g., 120 kHz, 240 kHz)), a UE may be enabled to perform random access on a RACH resource of any SS block with the same value of the 3 LSB bits of the SS block time index or the PBCH-DMRS sequence index.

In certain embodiments, during handover a serving cell may provide frequency-domain SS index in situations in which there are multiple SS blocks in frequency, as well as SS frequency specific additional time offsets for a target cell wideband CC.

Figure 7:
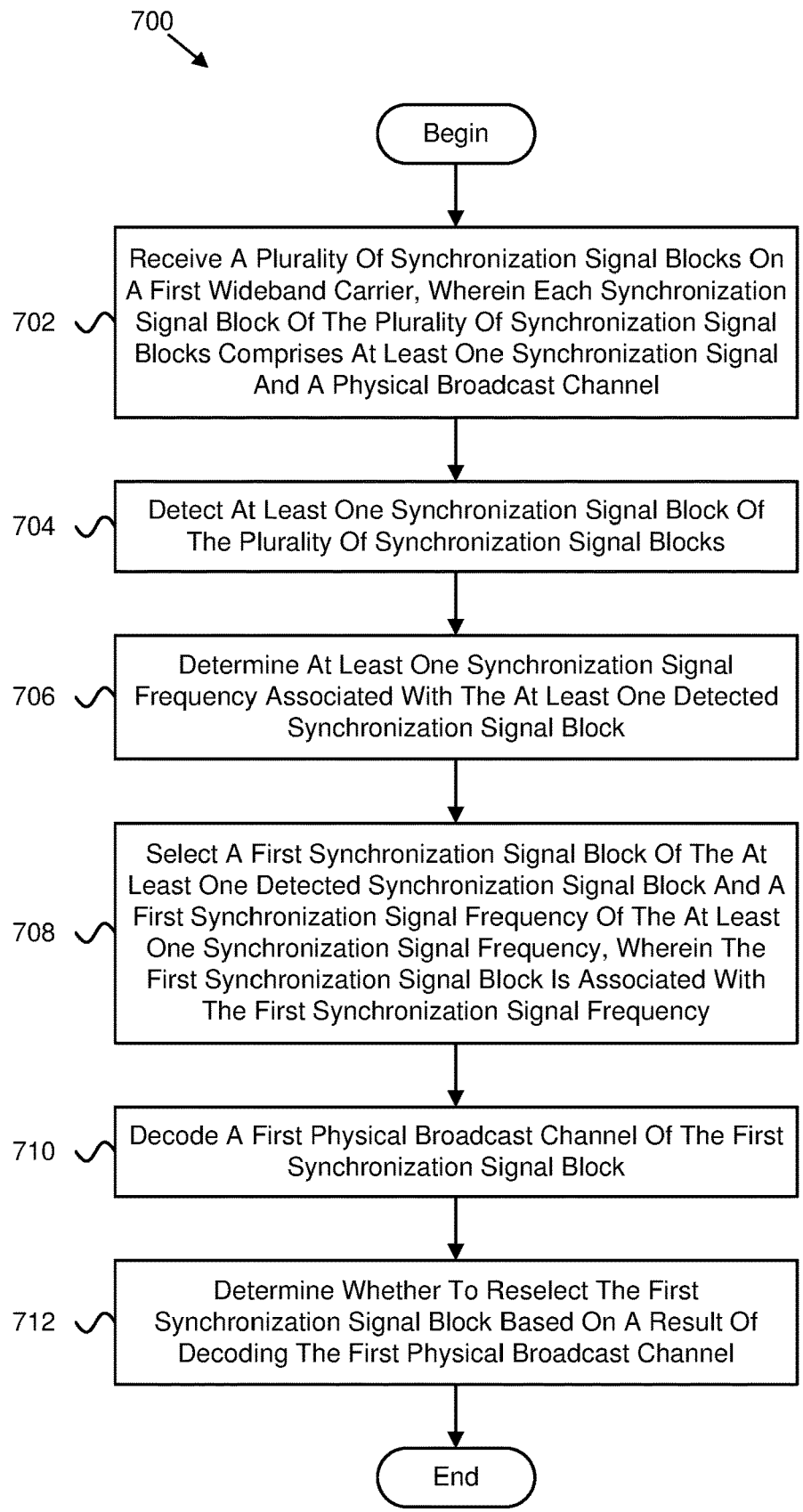
FIG. 7 is a flow chart diagram illustrating one embodiment of a method for synchronization signal block selection.

FIG. 7 is a flow chart diagram illustrating one embodiment of a method 700 for synchronization signal block selection. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 multiple synchronization signal blocks on a first wideband carrier. In such an embodiment, each synchronization signal block of the multiple synchronization signal blocks includes at least one synchronization signal and a physical broadcast channel. In certain embodiments, the method 700 includes detecting 704 at least one synchronization signal block of the multiple synchronization signal blocks. In some embodiments, the method 700 includes determining 706 at least one synchronization signal frequency associated with the at least one detected synchronization signal block. In various embodiments, the method 700 includes selecting 708 a first synchronization signal block of the at least one detected synchronization signal block and a first synchronization signal frequency of the at least one synchronization signal frequency. In such embodiments, the first synchronization signal block is associated with the first synchronization signal frequency. In certain embodiments, the method 700 includes decoding 710 a first physical broadcast channel of the first synchronization signal block. In some embodiments, the method 700 includes determining 712 whether to reselect the first synchronization signal block based on a result of decoding the first physical broadcast channel.

In various embodiments, multiple synchronization signal blocks are received on multiple synchronization signal frequencies of the first wideband carrier. In certain embodiments, the method 700 includes performing measurements on the at least one detected synchronization signal block. In some embodiments, the first synchronization signal block is selected based on the measurements, and the measurements include at least one of reference signal received power, reference signal received quality, and reference signal signal-to-interference and noise ratio.

In various embodiments, the method 700 includes: receiving offset values selected from a group including reference signal received power, reference signal received quality, and reference signal signal-to-interference and noise ratio for the at least one detected synchronization signal frequency; and determining whether to reselect the first synchronization signal block based on the measurement results and the offset values corresponding to the at least one detected synchronization signal frequency.

In certain embodiments, the method 700 includes, in response to determining to reselect the first synchronization signal block, reselecting a second synchronization signal block of the at least one detected synchronization signal block and a second synchronization signal frequency of the at least one synchronization signal frequency. In such embodiments, the second synchronization signal block is associated with the second synchronization signal frequency. In some embodiments, determining whether to reselect the first synchronization signal block is based on a subcarrier spacing value indicated in the first physical broadcast channel. This may be useful in conditions in which multiple frequency bands, each of which supports a different set of subcarrier spacing values, have an overlapping spectrum and/or in conditions in which a remote unit 102 has no prior knowledge on a frequency band associated with a detected synchronization signal block. In some embodiments, a remote unit 102 may not support a certain SCS due to a certain configured carrier aggregation combination.

In various embodiments, determining whether to reselect the first synchronization signal block is based on a physical downlink control channel configuration for remaining minimum system information indicated in the first physical broadcast channel. In certain embodiments, the multiple synchronization signal blocks are associated with a common physical cell identity. In some embodiments, the multiple synchronization signal blocks are associated with multiple physical cell identities. In various embodiments, the multiple synchronization signal blocks are divided into multiple synchronization signal burst sets.

In certain embodiments, at least two synchronization signal burst sets of the multiple synchronization signal burst sets include separate configurations. In some embodiments, each configuration of the separate configurations includes parameters selected from a group including a burst set periodicity, a number of synchronization signal blocks per synchronization signal burst set, a transmission power, and a synchronization signal block time location within a burst set.

In various embodiments, the method 700 includes: establishing a radio resource control connection with a cell associated with the first synchronization signal block of the first synchronization signal frequency of the first wideband carrier; and receiving at least one synchronization signal block based measurement timing configuration for a second wideband carrier. In such embodiments, the at least one synchronization signal block based measurement timing configuration includes a measurement window periodicity, a measurement window duration, a first measurement window offset, at least one associated synchronization signal frequency within the second wideband carrier, and a second measurement window offset corresponding to the at least one associated synchronization signal frequency.

In certain embodiments, the first wideband carrier is the same as the second wideband carrier. In some embodiments, the method 700 includes receiving indication of a synchronization signal frequency specific time offset value with respect to a synchronization signal time location for the first synchronization signal frequency of the first wideband carrier in the first physical broadcast channel or a physical downlink shared channel carrying remaining minimum system information.

Figure 8:
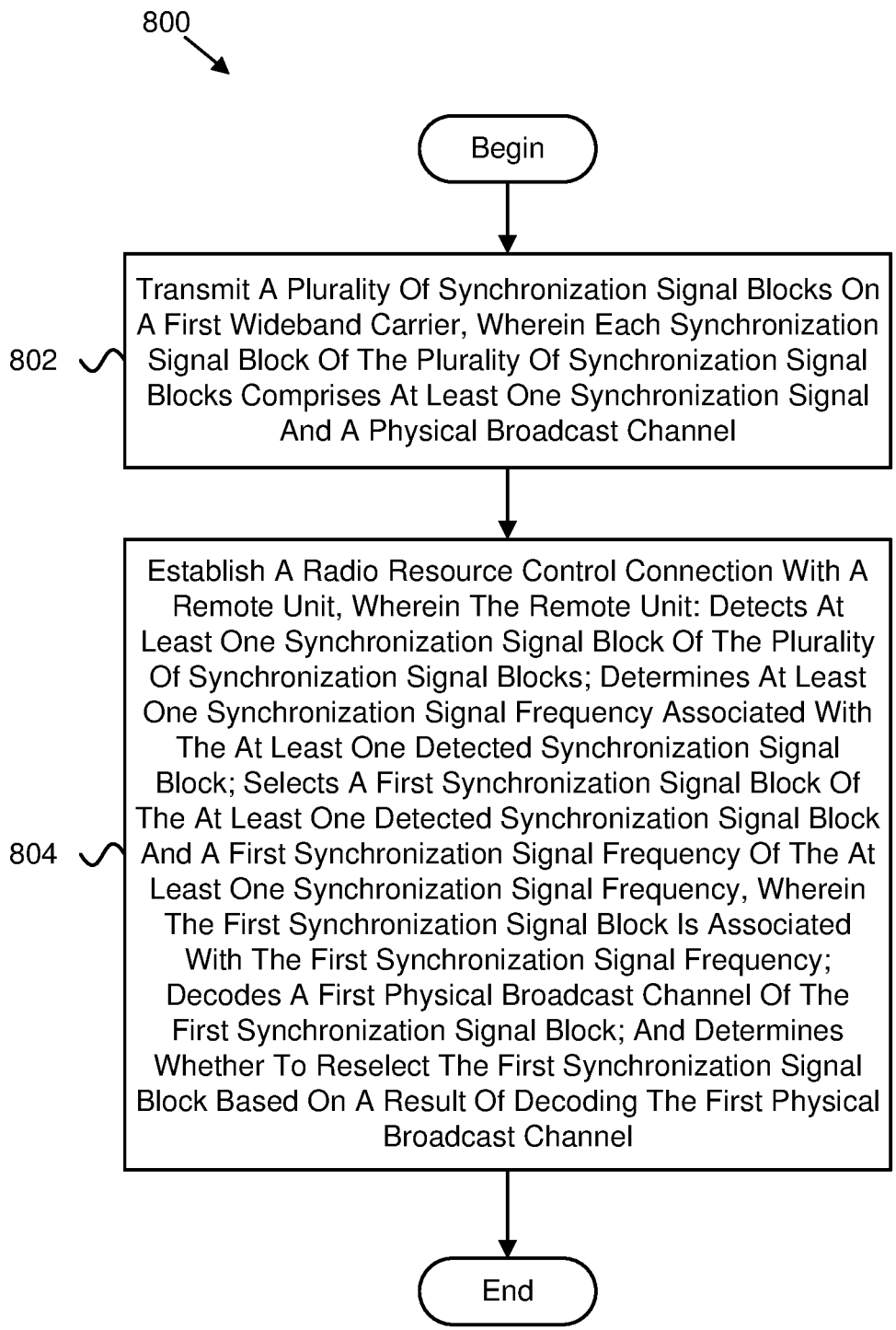
FIG. 8 is a flow chart diagram illustrating one embodiment of a method that may be used for synchronization signal block selection.

FIG. 8 is a flow chart diagram illustrating one embodiment of a method 800 that may be used for synchronization signal block selection. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 multiple synchronization signal blocks on a first wideband carrier. In such an embodiment, each synchronization signal block of the multiple synchronization signal blocks includes at least one synchronization signal and a physical broadcast channel. In certain embodiments, the method 800 includes establishing 804 a radio resource control connection with a remote unit 102. In such embodiments, the remote unit 102 may detect at least one synchronization signal block of the multiple synchronization signal blocks; determine at least one synchronization signal frequency associated with the at least one detected synchronization signal block; select a first synchronization signal block of the at least one detected synchronization signal block and a first synchronization signal frequency of the at least one synchronization signal frequency, wherein the first synchronization signal block is associated with the first synchronization signal frequency; decode a first physical broadcast channel of the first synchronization signal block; and determine whether to reselect the first synchronization signal block based on a result of decoding the first physical broadcast channel.

In various embodiments, the multiple synchronization signal blocks are transmitted on multiple synchronization signal frequencies of the first wideband carrier. In some embodiments, the multiple synchronization signal blocks are associated with a common physical cell identity. In certain embodiments, the multiple synchronization signal blocks are associated with multiple physical cell identities. In various embodiments, the multiple synchronization signal blocks are divided into multiple synchronization signal burst sets. In some embodiments, at least two synchronization signal burst sets of the multiple synchronization signal burst sets include separate configurations. In certain embodiments, each configuration of the separate configurations includes parameters selected from a group including a burst set periodicity, a number of synchronization signal blocks per synchronization signal burst set, a transmission power, and a synchronization signal block time location within a burst set. In various embodiments, the method 800 includes transmitting at least one synchronization signal block based measurement timing configuration for a second wideband carrier, wherein the at least one synchronization signal block based measurement timing configuration includes a measurement window periodicity, a measurement window duration, a first measurement window offset, at least one associated synchronization signal frequency within the second wideband carrier, and a second measurement window offset corresponding to the at least one associated synchronization signal frequency. In some embodiments, the first wideband carrier is the same as the second wideband carrier.

In some embodiments, the method 800 further includes transmitting offset values selected from a group comprising reference signal received power, reference signal received quality, and reference signal signal-to-interference and noise ratio for a synchronization signal frequency. In such embodiments, the remote unit 102 determines whether to reselect a synchronization signal block based on measurement results and the offset values corresponding to the synchronization signal frequency. In various embodiments, the method 800 includes transmitting information of a synchronization signal frequency specific time offset value of a synchronization signal block with respect to a reference synchronization signal block time location for the first wideband carrier in a physical broadcast channel of the synchronization signal block or a physical downlink shared channel carrying remaining minimum system information.

In certain embodiments, a method comprises: receiving a plurality of synchronization signal blocks on a first wideband carrier, wherein each synchronization signal block of the plurality of synchronization signal blocks comprises at least one synchronization signal and a physical broadcast channel; detecting at least one synchronization signal block of the plurality of synchronization signal blocks; determining at least one synchronization signal frequency associated with the at least one detected synchronization signal block; selecting a first synchronization signal block of the at least one detected synchronization signal block and a first synchronization signal frequency of the at least one synchronization signal frequency, wherein the first synchronization signal block is associated with the first synchronization signal frequency; decoding a first physical broadcast channel of the first synchronization signal block; and determining whether to reselect the first synchronization signal block based on a result of decoding the first physical broadcast channel.

In some embodiments, the plurality of synchronization signal blocks is received on a plurality of synchronization signal frequencies of the first wideband carrier.

In one embodiment, a method further comprises performing measurements on the at least one detected synchronization signal block.

In various embodiments, the first synchronization signal block is selected based on the measurements, and the measurements include at least one of reference signal received power, reference signal received quality, and reference signal signal-to-interference and noise ratio.

In certain embodiments, a method further comprises: receiving offset values selected from a group comprising reference signal received power, reference signal received quality, and reference signal signal-to-interference and noise ratio for the at least one detected synchronization signal frequency; and determining whether to reselect the first synchronization signal block based on the measurement results and the offset values corresponding to the at least one detected synchronization signal frequency.

In some embodiments, a method further comprises, in response to determining to reselect the first synchronization signal block, reselecting a second synchronization signal block of the at least one detected synchronization signal block and a second synchronization signal frequency of the at least one synchronization signal frequency, wherein the second synchronization signal block is associated with the second synchronization signal frequency.

In one embodiment, determining whether to reselect the first synchronization signal block is based on a subcarrier spacing value indicated in the first physical broadcast channel.

In various embodiments, determining whether to reselect the first synchronization signal block is based on a physical downlink control channel configuration for remaining minimum system information indicated in the first physical broadcast channel.

In some embodiments, a method further includes reselecting a synchronization signal block of the at least one detected synchronization signal block, and a cell associated with the reselected synchronization signal block has a greater number of synchronization signal blocks for which measurement values are above threshold values than other cells associated with other synchronization signal blocks of the at least one synchronization signal block.

In certain embodiments, the plurality of synchronization signal blocks is associated with a common physical cell identity.

In some embodiments, the plurality of synchronization signal blocks is associated with a plurality of physical cell identities.

In one embodiment, the plurality of synchronization signal blocks is divided into a plurality of synchronization signal burst sets.

In various embodiments, at least two synchronization signal burst sets of the plurality of synchronization signal burst sets comprise separate configurations.

In certain embodiments, each configuration of the separate configurations comprises parameters selected from a group comprising a burst set periodicity, a number of synchronization signal blocks per synchronization signal burst set, a transmission power, and a synchronization signal block time location within a burst set.

In some embodiments, a method comprises: establishing a radio resource control connection with a cell associated with the first synchronization signal block of the first synchronization signal frequency of the first wideband carrier; and receiving at least one synchronization signal block based measurement timing configuration for a second wideband carrier, wherein the at least one synchronization signal block based measurement timing configuration comprises a measurement window periodicity, a measurement window duration, a first measurement window offset, at least one associated synchronization signal frequency within the second wideband carrier, and a second measurement window offset corresponding to the at least one associated synchronization signal frequency.

In one embodiment, the first wideband carrier is the same as the second wideband carrier.

In various embodiments, a method further comprises receiving information of a synchronization signal frequency specific time offset value of a synchronization signal block with respect to a reference synchronization signal block time location for the first wideband carrier in a physical broadcast channel of the synchronization signal block or a physical downlink shared channel carrying remaining minimum system information.

In certain embodiments, an apparatus comprises: a receiver that receives a plurality of synchronization signal blocks on a first wideband carrier, wherein each synchronization signal block of the plurality of synchronization signal blocks comprises at least one synchronization signal and a physical broadcast channel; and a processor that: detects at least one synchronization signal block of the plurality of synchronization signal blocks; determines at least one synchronization signal frequency associated with the at least one detected synchronization signal block; selects a first synchronization signal block of the at least one detected synchronization signal block and a first synchronization signal frequency of the at least one synchronization signal frequency, wherein the first synchronization signal block is associated with the first synchronization signal frequency; decodes a first physical broadcast channel of the first synchronization signal block; and determines whether to reselect the first synchronization signal block based on a result of decoding the first physical broadcast channel.

In some embodiments, the plurality of synchronization signal blocks is received on a plurality of synchronization signal frequencies of the first wideband carrier.

In one embodiment, the processor performs measurements on the at least one detected synchronization signal block.

In various embodiments, the first synchronization signal block is selected based on the measurements, and the measurements include at least one of reference signal received power, reference signal received quality, and reference signal signal-to-interference and noise ratio.

In certain embodiments, the receiver receives offset values selected from a group comprising reference signal received power, reference signal received quality, and reference signal signal-to-interference and noise ratio for the at least one detected synchronization signal frequency, and the processor determines whether to reselect the first synchronization signal block based on the measurement results and the offset values corresponding to the at least one detected synchronization signal frequency.

In some embodiments, an apparatus further comprises, in response to determining to reselect the first synchronization signal block, the processor reselecting a second synchronization signal block of the at least one detected synchronization signal block and a second synchronization signal frequency of the at least one synchronization signal frequency, wherein the second synchronization signal block is associated with the second synchronization signal frequency.

In one embodiment, the processor determines whether to reselect the first synchronization signal block based on a subcarrier spacing value indicated in the first physical broadcast channel.

In various embodiments, the processor determines whether to reselect the first synchronization signal block based on a physical downlink control channel configuration for remaining minimum system information indicated in the first physical broadcast channel.

In some embodiments, the processor reselects a synchronization signal block of the at least one detected synchronization signal block, and a cell associated with the reselected synchronization signal block has a greater number of synchronization signal blocks for which measurement values are above threshold values than other cells associated with other synchronization signal blocks of the at least one detected synchronization signal block.

In certain embodiments, the plurality of synchronization signal blocks is associated with a common physical cell identity.

In some embodiments, the plurality of synchronization signal blocks is associated with a plurality of physical cell identities.

In one embodiment, the plurality of synchronization signal blocks is divided into a plurality of synchronization signal burst sets.

In various embodiments, at least two synchronization signal burst sets of the plurality of synchronization signal burst sets comprise separate configurations.

In certain embodiments, each configuration of the separate configurations comprises parameters selected from a group comprising a burst set periodicity, a number of synchronization signal blocks per synchronization signal burst set, a transmission power, and a synchronization signal block time location within a burst set.

In some embodiments, the processor establishes a radio resource control connection with a cell associated with the first synchronization signal block of the first synchronization signal frequency of the first wideband carrier, the receiver receives at least one synchronization signal block based measurement timing configuration for a second wideband carrier, and the at least one synchronization signal block based measurement timing configuration comprises a measurement window periodicity, a measurement window duration, a first measurement window offset, at least one associated synchronization signal frequency within the second wideband carrier, and a second measurement window offset corresponding to the at least one associated synchronization signal frequency.

In one embodiment, the first wideband carrier is the same as the second wideband carrier.

In various embodiments, the receiver receives information of a synchronization signal frequency specific time offset value of a synchronization signal block with respect to a reference synchronization signal block time location for the first wideband carrier in a physical broadcast channel of the synchronization signal block or a physical downlink shared channel carrying remaining minimum system information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving, at a user equipment (UE), a plurality of synchronization signal blocks (SSBs) associated with a plurality of synchronization signal (SS) frequencies, wherein each SSB of the plurality of SSBs comprises a SS signal and a physical broadcast channel (PBCH);
   detecting a first SSB of the plurality of SSBs, wherein the first SSB is associated with a first SS frequency;
   decoding a first PBCH of the first SSB;
   determining whether to reselect a SSB based on first system information obtained from decoding the first PBCH; and
   in response to determining to reselect the SSB, detecting a second SSB associated with a second SS frequency, wherein the second SS frequency is different from the first SS frequency.

2. The method of claim 1, further comprising performing one or more reference signal received power (RSRP) measurements on the detected first SSB.

3. The method of claim 2, further comprising determining whether a measured RSRP value of the first SSB satisfies a threshold value.

4. The method of claim 1, further comprising determining to reselect the SSB in response to the first system information indicating that a cell corresponding to the SSB is barred for the UE to camp on.

5. The method of claim 1, wherein the first system information includes information of a common control resource set (CORESET) and a common search space, and wherein the common CORESET and the common search space are associated with the first SSB.

6. The method of claim 5, wherein determining whether to reselect the SSB comprises determining whether to reselect the SSB based on a bandwidth of the common CORESET or a frequency location of the common CORESET, or both.

7. The method of claim 5, further comprising receiving a common physical downlink control channel (PDCCH) based on the common CORESET and the common search space, wherein the common PDCCH includes scheduling information of a physical downlink shared channel (PDSCH), and wherein the PDSCH includes second system information.

8. The method of claim 1, wherein the first system information includes an indication of subcarrier spacing.

9. The method of claim 8, wherein determining whether to reselect the SSB comprises determining whether to reselect the SSB based on the indication of the subcarrier spacing.

10. The method of claim 1, wherein the plurality of SS frequencies is within a wideband carrier.

11. The method of claim 1, wherein the plurality of SSBs comprises a plurality of SS burst sets, and a SS burst set of the plurality of SS burst sets is associated with a SS frequency of the plurality of SS frequencies.

12. The method of claim 11, wherein a first SS burst set and a second SS burst set of the plurality of SS burst sets are associated with a first SS frequency and a second SS frequencies frequency of the plurality of SS frequencies, and wherein the first SS burst set and the second SS burst set of the plurality of SS burst sets are associated with a first cell and a second cell, and wherein the first cell and second cell comprise separate cell configurations.

13. The method of claim 12, wherein each cell configuration of the separate cell configurations indicate one or more of a burst set periodicity, a number of SSBs per SS burst set, a transmission power, or at least one SSB time location occupied by SSBs within a burst set.

14. An apparatus comprising:
   a processor; and
   a memory coupled to the processor, the memory comprising instructions executable by the processor to cause the apparatus to:
     receive a plurality of synchronization signal blocks (SSBs) associated with a plurality of synchronization signal (SS) frequencies, wherein each SSB of the plurality of SSBs comprises a SS and a physical broadcast channel (PBCH);
     detect a first SSB of the plurality of SSBs, wherein the first SSB is associated with a first SS frequency;
     decode a first PBCH of the first SSB;
     determine whether to reselect a SSB based on first system information obtained from decoding the first PBCH; and in response to determining to reselect the SSB, detect a second SSB associated with a second SS frequency, wherein the second SS frequency is different from the first SS frequency.

15. The apparatus of claim 14, wherein the instructions are further executable by the processor to cause the apparatus to perform one or more reference signal received power (RSRP) measurements on the detected first SSB.

16. The apparatus of claim 15, wherein the instructions are further executable by the processor to cause the apparatus to determine whether a measured RSRP value of the first SSB satisfies a threshold value.

17. The apparatus of claim 14, wherein the instructions are further executable by the processor to cause the apparatus to determine to reselect the SSB if the first system information indicates that a cell corresponding to the SSB is barred for the apparatus to camp on.

18. The apparatus of claim 14, wherein the first system information includes information of a common control resource set (CORESET) and a common search space, and wherein the common CORESET and the common search space are associated with the first SSB.

19. The apparatus of claim 18, wherein the instructions are further executable by the processor to cause the apparatus to determine whether to reselect the SSB by determining whether to reselect the SSB based on a bandwidth of the common CORESET or a frequency location of the common CORESET, or both.

20. The apparatus of claim 18, wherein the instructions are further executable by the processor to cause the apparatus to receive a common physical downlink control channel (PDCCH) based on the common CORESET and the common search space, wherein the common PDCCH includes scheduling information of a physical downlink shared channel (PDSCH), and wherein the PDSCH includes second system information.

\* \* \* \* \*